No. 875,013. PATENTED DEC. 31, 1907.
W. A. TURNER.
CARRIAGE FOR CONVEYING DRUMS OF ELECTRIC CABLES.
APPLICATION FILED FEB. 11, 1907.
3 SHEETS—SHEET 1.
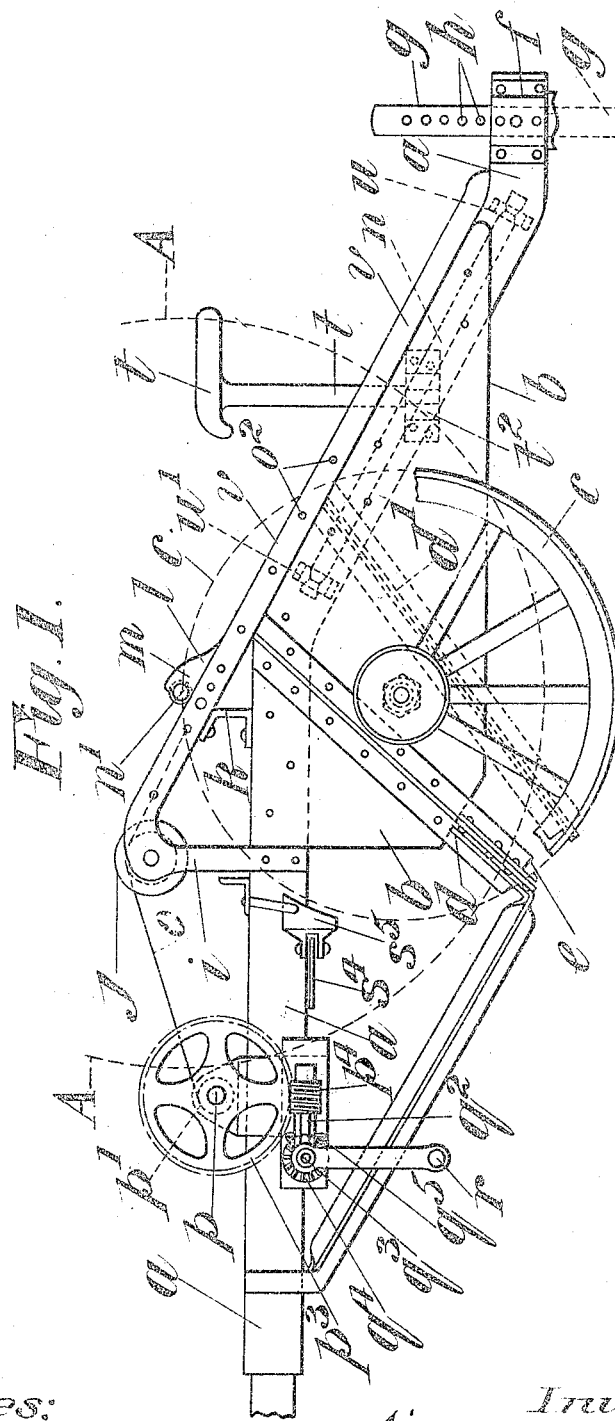

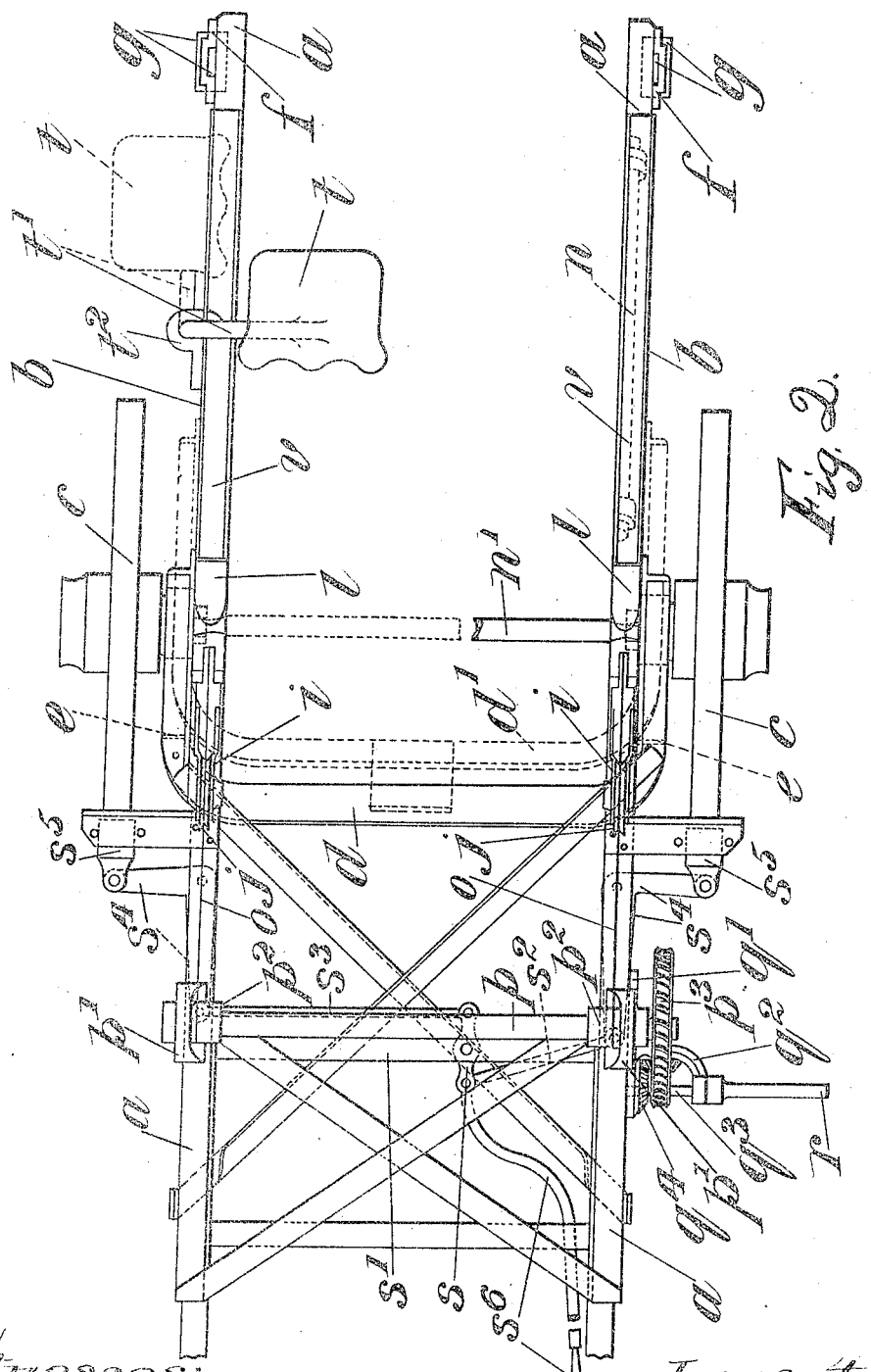

No. 875,013. PATENTED DEC. 31, 1907.
W. A. TURNER.
CARRIAGE FOR CONVEYING DRUMS OF ELECTRIC CABLES.
APPLICATION FILED FEB. 11, 1907.
3 SHEETS—SHEET 3.
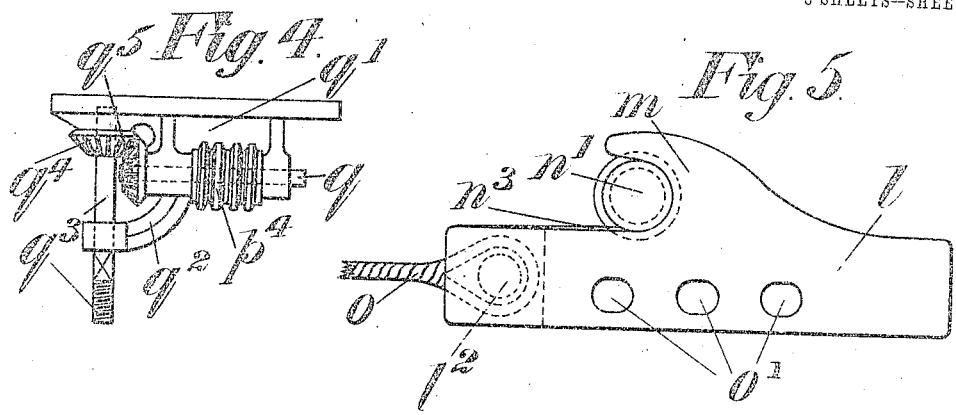
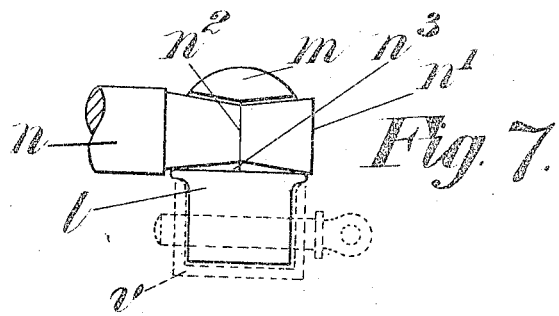
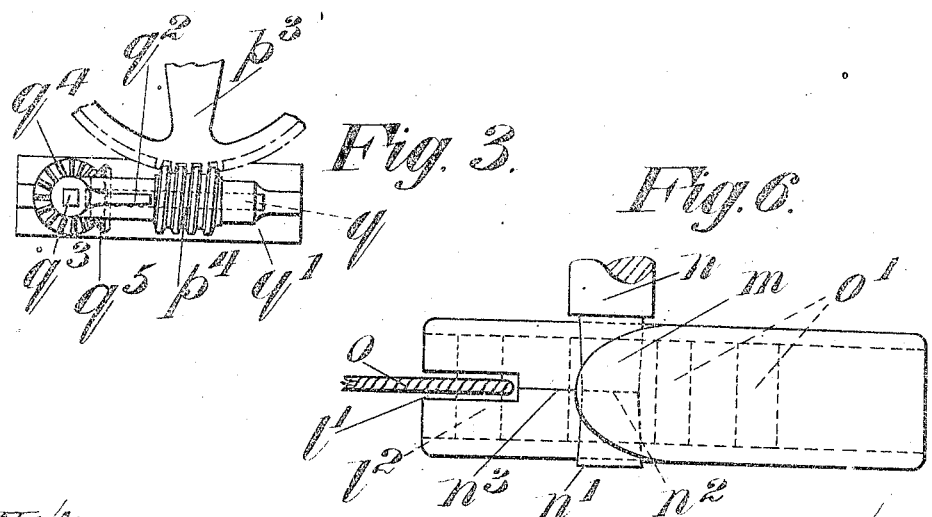

UNITED STATES PATENT OFFICE.

WILLIAM ALBERT TURNER, OF GLASGOW, SCOTLAND.

CARRIAGE FOR CONVEYING DRUMS OF ELECTRIC CABLES.

No. 875,018.  Specification of Letters Patent.  Patented Dec. 31, 1907.

Application filed February 11, 1907. Serial No. 356,838.

*To all whom it may concern:*

Be it known that I, WILLIAM ALBERT TURNER, a subject of the King of Great Britain, residing at 3 Hamilton street, Partick, Glasgow, Scotland, have invented certain new and useful Improvements in Carriages for Conveying Drums of Electric Cables and Such Like, of which the following is a specification.

This invention relates to carriages for conveying drums of electric cables and such like and it has for its object to construct a wheeled vehicle which shall be capable of carrying or conveying any size of drum at present in use and which shall, at the same time, be light, compact, and strong and so made that one man can carry out all the operations of loading and unloading.

In order that my said invention may be properly understood I have hereunto appended three explanatory sheets of drawings, whereon:—

Figure 1 is a side view of a carriage as constructed under this invention. Fig. 2 is a plan view of the same. Figs. 3 and 4 are side and plan views, respectively, to an enlarged scale, of the winding gear. Figs. 5, 6, and 7 are side, plan, and end views, respectively, to an enlarged scale, of one of the sliding shoes and spindle for supporting the cable drum.

In carrying out my invention I make a carriage frame which comprises two long steel channels $a$ (though steels of any other suitable section may be used, if desired), which extend the whole length of the carriage and form the sides thereof. Depending from each of these channels is a plate $b$ which is preferably riveted in place. The plates $b$ serve to strengthen the sides of the frame while they also serve as bearings for the wheels $c$. The channels $a$ are suitably connected together by means of a metal strap $d$ of tee or other section and which is bent to a somewhat U shape and is secured by riveting or otherwise to the depending plates $b$. In order to strengthen this strap at its bent portions curved plates $e$ may be riveted thereto. If desired, in some cases, an extra strap $d^1$ may, as shown in dotted lines, be used to give additional strength.

Each channel $a$ is bent downwards at its rear end and is provided with a bracket or the like $f$ having an opening therein in which is movably fitted a shoe $g$ capable of being dropped to the ground to support the carriage when being loaded or unloaded. Each shoe $g$ is provided with a series of holes $h$ into one or other of which a pin can be inserted through the bracket $f$ so as to allow of adjustment according to the nature of the ground. When the loading or unloading is being effected the shoes are lowered and rest on the ground as indicated in dotted lines at Fig. 1, but when the loading or unloading has been effected the shoes $g$ are raised up off the ground and retained in the raised position shown in full lines in Fig. 1.

Secured on the top of the bent portion of each channel $a$, by riveting or in other suitable manner, is a guide or channel $v$ the upper end of which extends some distance above the upper part of the channel $a$ and has fitted therein the upper end of a suitably shaped bracket $i$ secured at its lower end to the channel $a$ and which is forked or slotted at its upper end for the reception of a grooved pulley $j$. A strengthening bracket or angle piece $k$ may also be riveted to the under side of the guide or channel $v$ and to the channel $a$.

A sliding shoe $l$ is fitted in each guide or channel $v$ and the shoes, as shown clearly at Figs. 5 and 6, are each made with a curved upwardly projecting part $m$ which forms a bearing for the removable drum spindle $n$. As will be seen at Figs. 6 and 7 this spindle $n$ is slightly reduced in diameter at its ends $n^1$ which rest in the shoes and in order to grip securely in the shoes and at the same time assist in binding or locking the two sides of the carriage together, when loaded, each of the reduced ends $n^1$ of the spindle is made of a double cone shape, as shown, the depressed central part $n^2$ resting on the correspondingly raised central part $n^3$ of the bearing $m$. Each shoe $l$ is made with a slot $l^1$ at one end in which is secured, on a pin $l^2$, the one end of a winding rope or its equivalent $o$, the other end being secured to the winding gear situated some distance in front of the grooved pulley $j$. The sliding shoes $l$ are preferably made with a series of slots or openings $o^1$ while the guides or channels $v$ are also made with similar slots or openings $o^2$ the arrangement being such, that, when the carriage is loaded and the drum A (indicated by the dotted line Fig. 1) raised into the desired position by means of the winding gear, pins can be inserted in one or other of the slots or openings thereby holding the shoes securely in position and releasing the strain from the ropes $o$.

The winding gear consists of a shaft $p$ working in bearings $p^1$ secured to the sides of the carriage. Fitted on the shaft $p$ are two winding barrels or drums $p^2$ on which the ropes or their equivalent $o$ can be wound. Secured to one end of the shaft $p$ is a worm wheel $p^3$ which gears with a worm $p^4$ fitted on a shaft $q$ working in a bracket $q^1$ secured to the side of the carriage. The bracket $q^1$ is made with an arm $q^2$ which carries a shaft $q^3$ arranged at right angles to the shaft $q$ and provided with a bevel wheel $q^4$ gearing with a bevel wheel $q^5$ on the shaft $q$. A suitable handle $r$ is fitted on the outer end of the shaft $q^3$ and by means of this handle the gearing can be actuated.

The carriage is provided with suitable brake mechanism which may consist of a lever $s$ centered on a cross bar $s^1$ and provided at the one end with a link $s^2$ and at the other end with a link $s^3$ which are connected to bell crank levers $s^4$ and brake shoes $s^5$ secured to the sides of the carriage. An actuating lever $s^6$ is provid, the arrangement being such that, when the lever $s^6$ is moved, the brake shoes can be brought into contact with the wheel $c$ (and held by means of a rack) or moved therefrom as desired.

A driver's seat $t$ is provided on the carriage and this seat may be placed, as usual, on the front thereof or, it may, as shown in the drawings, be placed at the rear and be supported on a pillar $t^1$ fitted in a socket $t^2$. The pillar is preferably squared at its lower end so that when the carriage is being loaded the seat and pillar may be removed from the socket $t^2$ and turned outwards, as shown in dotted lines, so as to clear the drum A.

When the carriage is empty the removable drum spindle $n$ is preferably secured to the side thereof by means of a bracket $u$ having a hole therein for the reception of one end of the spindle while its other end is gripped or supported in a suitable clip $u^1$. With this arrangement the spindle is firmly secured to the vehicle while at the same time it can be readily removed for use when required.

In loading, the spindle $n$ is first passed through the drum A and the carriage is backed up to the drum, the sliding shoes $l$ are then manipulated so as to catch the ends of the spindle $n$ when the drum A can be lifted to the height required to clear the ground by simply turning the gearing by means of the handle $r$. Before lifting the drum the drop shoes or supports $g$ at the back of the carriage are lowered to the ground to take the weight, and then the sliding shoes $l$ carrying the drum A are drawn up the channels $v$ to the required position by means of the worm gearing $p^3$, $p^4$ and are finally secured in the channels $v$ by means of their pins. The drop shoes $g$ are subsequently raised from the ground and secured by a pin or the like.

Having now fully described my invention what I claim and desire to secure by Letters Patent is:—

1. A carriage for conveying the drums of electric cables and such like comprising, in combination, a frame mounted on two wheels which is open at its rear end and which is also inclined, shoes slidably fitted on the frame and adapted to support the drum and means whereby the shoes can be locked in different positions on the inclined frame.

2. A carriage for conveying the drums of electric cables and such like comprising, in combination, a frame mounted on two wheels, which is open at its rear end and which is also inclined, shoes slidably fitted on the inclined part of the frame, means whereby the shoes can be locked in different positions on the inclined frame, and means for raising and lowering the shoes on the incline.

3. A carriage for conveying the drums of electric cables and such like comprising, in combination, a frame mounted on two wheels, which is open at its rear end and which is also inclined, sliding shoes which can be raised or lowered on the inclined frame, means whereby the shoes can be locked in different positions on the inclined frame, and gearing for moving the shoes.

4. A carriage for conveying the drums of electric cables and such like comprising, in combination, a frame mounted on two wheels, which is open at its rear end and which is also inclined, sliding shoes having projections thereon for supporting the ends of a removable spindle which can be passed through the drum to allow of the latter being raised off the ground and means for moving the shoes.

5. A carriage for conveying the drums of electric cables and such like comprising, in combination a frame built up of channels with depending plates at each side thereof, a strap connecting said channels, sliding shoes in the channels and means for raising and lowering said shoes.

6. The combination with a carriage for conveying the drums of electric cables and such like, of sliding shoes for raising the drum, each shoe being made with a number of slots or openings and with a curved projecting part provided with a raised central part shaped so as to form a bearing for the drum spindle.

7. In combination, a carriage for conveying the drums of electric cables and such like, sliding shoes having curved projections for raising the drum on the carriage, a spindle for supporting the drum, said spindle being made at each end with a depressed central part adapted to fit a correspondingly raised central part on the curved projections of the sliding shoes.

8. A carriage for conveying drums of electric cables, comprising, in combination, a channeled frame having depending plates, straps connecting said plates, sliding shoes on the frame, means for raising and lowering the shoes, means for supporting the drum and adjustable drop shoes or supports at the back of the carriage for taking the weight when loading.

9. A carriage for conveying drums of electric cables comprising, in combination, a channeled frame having depending plates, straps connecting said plates, sliding shoes on the frame, means for raising and lowering the shoes and an adjustable driver's seat supported on a pillar squared at its lower end and fitted in a socket so that, when the carriage is being loaded, the seat and pillar may be removed from the socket and turned outwards clear of the drum.

10. A carriage for conveying drums of electric cables comprising, in combination, a channeled frame having depending plates, straps connecting said plates, sliding shoes on the frame, means for raising and lowering the shoes, means for supporting the drum, adjustable drop shoes or supports at the back of the carriage for taking the weight when loading, and brake mechanism by means of which brake shoes can be brought into contact with the wheels and held in position or moved out of contact with the wheels.

11. In a carriage for conveying the drums of electric cables and the like, a frame built up of channels, a connection between said channels, means whereby the shoes can be locked in different positions on the inclined frame, sliding shoes in the channels, and means for raising and lowering said shoes.

In testimony whereof I affix my signature in presence of two witnesses.

WILLIAM ALBERT TURNER.

Witnesses:
 H. D. FITZPATRICK,
 WILLIAM GALL.